US011113883B2

(12) United States Patent
Zia et al.

(10) Patent No.: US 11,113,883 B2
(45) Date of Patent: Sep. 7, 2021

(54) TECHNIQUES FOR RECOMMENDING AND PRESENTING PRODUCTS IN AN AUGMENTED REALITY SCENE

(71) Applicant: Houzz, Inc., Palo Alto, CA (US)

(72) Inventors: Khurram Zia, Palo Alto, CA (US); Sanjay Raman, Palo Alto, CA (US); Aaron Yip, Menlo Park, CA (US)

(73) Assignee: Houzz, Inc., Palo Alto, CA (US)

( * ) Notice: Subject to any disclaimer, the term of this patent is extended or adjusted under 35 U.S.C. 154(b) by 357 days.

(21) Appl. No.: 15/853,121

(22) Filed: Dec. 22, 2017

(65) Prior Publication Data
US 2019/0197599 A1 Jun. 27, 2019

(51) Int. Cl.
G06T 19/00 (2011.01)
G06Q 30/06 (2012.01)

(52) U.S. Cl.
CPC ....... G06T 19/006 (2013.01); G06Q 30/0631 (2013.01); G06Q 30/0641 (2013.01); G06Q 30/0643 (2013.01); G06T 2210/04 (2013.01)

(58) Field of Classification Search
None
See application file for complete search history.

(56) References Cited

U.S. PATENT DOCUMENTS

| 7,062,722 | B1 | 6/2006 | Carlin et al. | |
| 2008/0071559 | A1* | 3/2008 | Arrasvuori | G06Q 30/0601 705/26.1 |
| 2013/0187905 | A1 | 7/2013 | Vaddadi et al. | |
| 2016/0133230 | A1* | 5/2016 | Daniels | G06F 3/147 345/633 |
| 2016/0240010 | A1 | 8/2016 | Rosenthal et al. | |
| 2018/0143756 | A1* | 5/2018 | Mildrew | G06F 3/0482 |
| 2019/0172261 | A1* | 6/2019 | Alt | G06F 3/011 |
| 2020/0051338 | A1 | 2/2020 | Zia et al. | |

FOREIGN PATENT DOCUMENTS

WO 2019126002 6/2019

OTHER PUBLICATIONS

"International Application Serial No. PCT US2018 065941, Invitation to Pay Additional Fees and Partial Search Report dated Mar. 21, 2019", 13 pgs.
"International Application Serial No. PCT US2018 065941, International Search Report dated May 14, 2019", 6 pgs.
"International Application Serial No. PCT US2018 065941, Written Opinion dated May 14, 2019", 10 pgs.

(Continued)

Primary Examiner — Vu Nguyen
(74) Attorney, Agent, or Firm — Schwegman Lundberg & Woessner, P.A.

(57) ABSTRACT

Described herein is an augmented reality application-based service, which facilitates techniques for aiding a first end-user (e.g., a room designer) with the selection and placement of objects (e.g., images of home furnishing and related products) in an augmented reality scene that is being, or has been, generated via a mobile computing device that is remote from the first end-user, such that a second end-user (e.g., a potential consumer) operating the mobile computing device can view objects, in the augmented reality scene, as placed by the first, remote end-user.

5 Claims, 8 Drawing Sheets

(56) References Cited

OTHER PUBLICATIONS

Klaus, Ahlers H, "Distributed Augmented Reality for Collaborative Design Applications", Computer Graphics Forum, vol. 14, No. 3, (Aug. 1995), 3-14.
"International Application Serial No. PCT/US2018/065941, International Preliminary Report on Patentability dated Jul. 2, 2020", 12 pgs.
"U.S. Appl. No. 16/549,459, Non Final Office Action dated Sep. 18, 2020", 10 pgs.
"U.S. Appl. No. 16/549,459, Final Office Action dated Jan. 29, 2021", 11 pgs.

\* cited by examiner

TECHNIQUES FOR RECOMMENDING AND PRESENTING PRODUCTS IN AN AUGMENTED REALITY SCENE

TECHNICAL FIELD

The subject matter disclosed herein generally relates to data processing systems and computer-based, user interfaces for intelligently selecting and presenting objects (e.g., products, such as furniture and home furnishings) for placement in an augmented reality scene. More specifically, the present invention relates to computer program products, methods and systems that facilitate techniques for aiding a first end-user (e.g., a room designer) with the selection and placement of objects (e.g., images of home furnishing and related products) in an augmented reality scene that is being, or has been, generated via a mobile computing device that is remote from the first end-user, such that a second end-user (e.g., a potential consumer) operating the mobile computing device can view objects, in the augmented reality scene, as placed by the first, remote end-user.

BACKGROUND

In the context of computing, augmented reality ("AR") is a live direct, or indirect, view of a physical, real-world scene whose elements are "augmented" with superimposed, computer-generated sensory input, such as video or graphic images. These added images, which are overlaid upon the real-world scene, serve to enhance the scene and provide an enriched visual experience for the end-user. Advancements in various computing and sensor technologies have made it possible to have mobile computing devices (e.g., mobile phones, tablet computers, head-mounted displays and glasses) capable of executing AR applications. As an example, modern versions of mobile operating systems, such as iOS® from Apple® and the Android® operating system from Google®, provide software frameworks and development tools that allow developers to create AR applications for mobile phones, tablets and other mobile computing devices.

With a typical AR application for a mobile computing device, an end-user manipulates the mobile computing device to point a camera of the device in the direction of a real-world scene the end-user wishes to render in AR. The scene is then captured by the camera and displayed on the display of the device, while the device simultaneously superimposes one or more images (graphics and/or video) on the scene. The camera and/or other sensors may capture additional information from the environment that allows the mobile computing device to determine its position, orientation and motion, relative to visually distinguishing features, objects and/or inferred planes (e.g., walls, floors or other flat surfaces) in the images being captured by the camera, and thereby manipulate the rendering (e.g., position, skew and size) of any superimposed images to maintain the proper perspective and scale. This makes the presentation of the superimposed images seem realistic, creating an illusion for the viewer that the objects represented by the superimposed images are physically present in the scene.

As AR-related technologies improve, new AR applications are being developed and introduced. In the retail industry, AR applications are increasingly being used to provide end-users with the ability to visualize products (e.g., home furnishings and related products) in and around their real-world environments. For example, several applications have been developed that allow an end-user to select a product (e.g., a chair) from an online "catalog" of products, and then place the chair in a room using an AR application, allowing the end-user to visualize the room with the chair, without the commitment and hassle of having the chair physically present. Accordingly, the room can be viewed via the display of the end-user's mobile computing device to visualize the room, as if the chair was present.

BRIEF DESCRIPTION OF THE DRAWINGS

Embodiments of the present invention are illustrated by way of example and not limitation in the figures of the accompanying drawings, in which.

DETAILED DESCRIPTION

Figure 1:
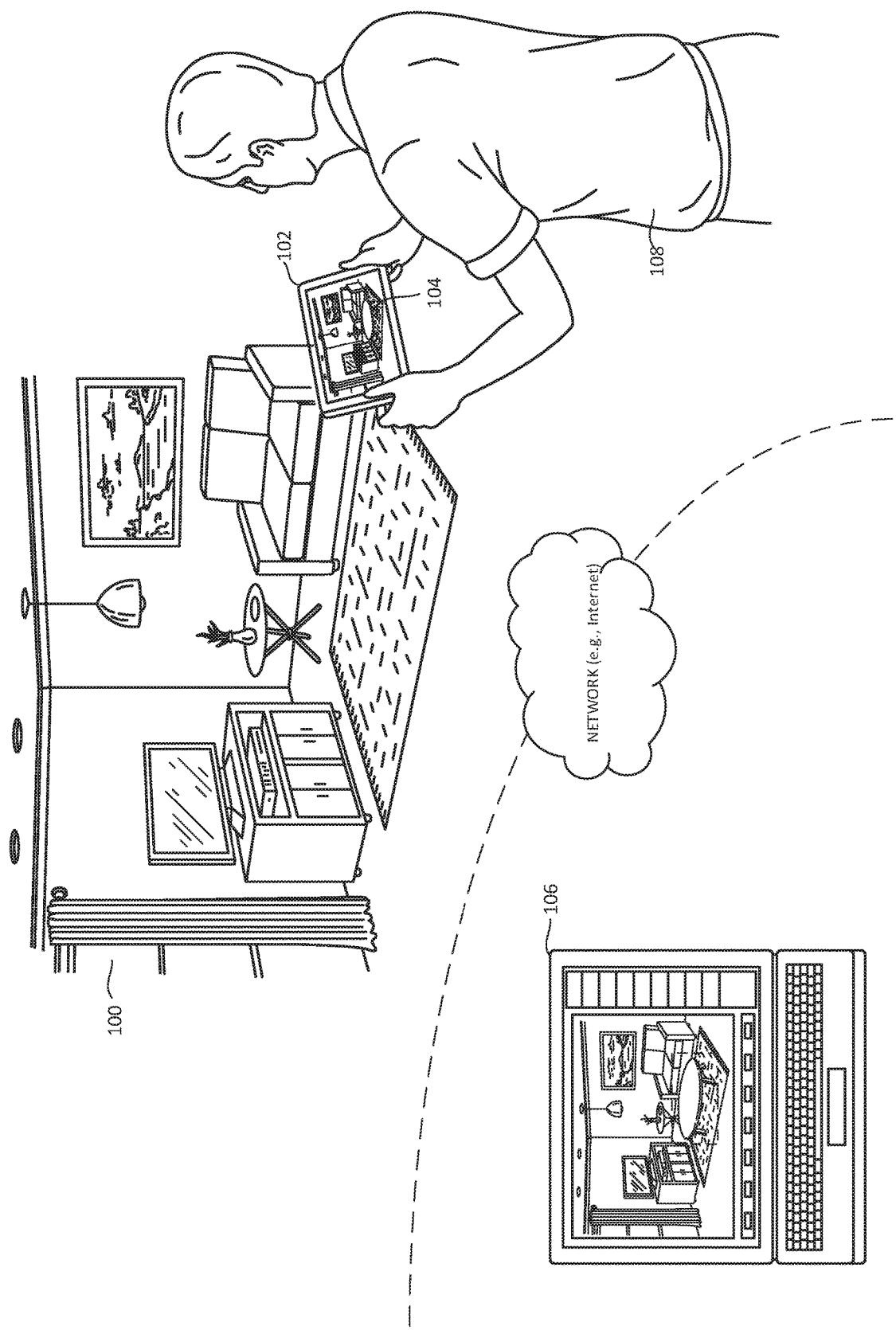
FIG. 1 is an illustration showing a scene (e.g., a room) that is being rendered on an AR-capable mobile application executing on a tablet computer and augmented with an image of a coffee table that has been selected and placed in the AR view of the room by a person operating a client computing device that is remote from the room and tablet computer, according to some embodiments of the present invention.

Described herein are methods, systems and computer program products to facilitate techniques for aiding a room designer with the selection and placement of objects (e.g., images of home furnishings and related products) in an augmented reality scene that is being, or has been, generated via a mobile computing device of an end-user (e.g., a potential consumer) that is remote from the room designer. In the following description, for purposes of explanation, numerous specific details are set forth in order to provide a thorough understanding of the various aspects of different embodiments of the present invention. It will be evident, however, to one skilled in the art, that the present invention may be practiced without all of these specific details.

As presented herein, the present invention is described in the context of an online, augmented reality (AR), application-based room design service. In general, this room design service provides a collaborative platform via which end-users (e.g., potential consumers) can interact in real time with one of a team of room designers. The design service is generally comprised of two components that operate together—an AR mobile application, via which an end-user captures and views an AR view of a physical space, and a room design application having a user interface via which a room designer selects and positions products, which ultimately causes images of those products to appear in the AR view of the physical space, as generated at the AR-capable mobile computing device of the end-user. As such, for purposes of the present disclosure, the term "end-user" will be used in reference to a potential consumer or person who is operating an AR-capable mobile computing device, executing an AR mobile application, in some physical space (e.g., a room) in an effort to visualize that space, enhanced with some visual content. Similarly, for purposes of the present disclosure, the term "room designer" is used in reference to a person operating a room design application, typically executing on a client computing device, that is remote from the end-user.

Using the AR mobile application, an end-user will invoke an AR viewing session. During the AR viewing session, the AR-capable mobile computing device uses input received from a combination of one or more image sensors and motion sensors to generate a data representation of a virtual space that corresponds with the physical space in which the mobile computing device is being operated. The virtual space is constructed from mobile sensors that enable AR capabilities, which may include streams of multiple types of data such as RGB images, depth images, IMU (inertial measurement unit) sampling, and inferred scene geometry. This data representation of a virtual space, referred to hereafter as simply AR metadata, is used to determine the position of the mobile computing device (and specifically, the image sensor or camera) relative to visually distinguishing features, objects and/or inferred planes in the images being captured by the image sensor or camera of the mobile computing device. As such, the AR metadata allows the AR mobile application to "pin" objects to a position within the virtual space, so that images of those objects can be properly rendered (e.g., position, skew and size) as superimposed over images of the physical space, thereby giving the end-user the perception that the objects (e.g., superimposed images) are physically present in the physical space.

Consistent with some embodiments, during an AR viewing session, one or more images of a physical space (e.g., a room) in combination with the corresponding AR metadata for that physical space, as captured by the mobile computing device, are communicated to a remote server. By way of example, during the AR viewing session, the end-user may press a button—a physical button of the mobile computing device, or a graphical user interface element presented on the display of the mobile computing device—causing a single still image of the physical space (e.g., a room) to be captured and communicated to the remote server, along with the corresponding AR metadata. Alternatively, with other embodiments, a series of images (e.g., a video stream) may be communicated to the remote server with the corresponding AR metadata. Using the room design application, a room designer can access and view the video stream, and select one (or, more) images from the video stream. In any case, the room designer, using the room designer application executing on a client computing device with access to the remote server, will have shared access to one or more images of a physical space and the corresponding AR metadata that embodies the data representation of the virtual space for the physical space, as the images and AR metadata are being generated by the AR mobile application executing on the end-user's AR-capable mobile computing device. Accordingly, the room designer can select visual content associated with various products available from an online marketplace of products (e.g., furniture and related home furnishings) and then position those products in relation to the virtual space represented by the AR metadata. As a result, during the AR viewing session, the end-user of the AR mobile application is able to view a physical space, augmented with superimposed images of products that have been both selected and positioned by a room designer, who is remote from the end-user.

Consistent with some embodiments of the present invention, the AR application-based room design service provides a collaborative platform via which the end-user can communicate in real-time (e.g., via voice or video call) with a room designer. For instance, while simultaneously sharing an image (or, images) and corresponding AR metadata of a scene, as captured by one or more cameras of the end-user's mobile computing device, the end-user can communicate various product preferences to the room designer. Furthermore, using computer vision and object recognition analysis, the shared image (or, images) received from the end-user's mobile computing device is analyzed to identify objects (and their attributes) present in the image. Accordingly, the information extracted from analyzing an image is used, in combination with explicit and/or inferred end-user preference information, to query one or more databases of products to quickly and efficiently identify products that may be both complementary to those products identified in the image, and suiting the preferences and tastes of the end-user. As such, by interacting with the room design application, the room designer can select and position products within images, as presented on his or her client computing device, such that the positioned products will also appear in a live AR scene as rendered by the end-user's AR-capable mobile computing device. The end-user benefits by having the expertise of the room designer in both selecting appropriate products, and positioning or designing the layout and look of those products in the end-user's room, to coordinate with the existing look of the room.

Consistent with some embodiments of the present invention, the end-user and room designer may collaborate in real time, such that the end-user can communicate product preferences to the room designer over a voice or video call. However, with some embodiments, the collaboration may be asynchronous in nature. For example, the image (or, images) and corresponding AR metadata, as captured by the end-user's AR-capable mobile computing device, may be communicated to and stored at a remote server. A room designer, using the room design application, may subsequently access the previously captured image(s) and AR metadata, select and position one or more products to appear in one or more images, and then save the resulting room design at the server computer. The end-user can then recall the room design as saved on the remote server. Upon initiating a subsequent AR viewing session in the same physical space for which a room designer has saved a room design, the AR mobile application will need to perform a realignment procedure to ensure that the old AR metadata (e.g., as originally shared with the room designer) is consistent with the new AR metadata (e.g., as generated during the current live AR viewing session). Accordingly, this allows the end-user to view the positioned products in a live AR view, at some time subsequent to when the room designer created the room design. Other aspects of the present inventive subject matter will be readily ascertainable from the description of the figures that follow.

FIG. 1 is an illustration showing a scene (e.g., room 100) that is being rendered by an AR-capable mobile application executing on a tablet computer 102 and augmented with an image of a coffee table 104 that has been selected and placed in the AR view of the room by a room designer (not shown) operating a client computing device 106 that is remote from the room 100 and tablet computer 102, consistent with some embodiments of the present invention. In this example, the end-user 108 is interested in purchasing a coffee table for his room 100. Using an AR application-based room design service, the end-user 108 initiates, via a mobile application executing on his tablet computer, a design consultation session with a remote room designer. When the session is initiated, one or more images from the live scene are captured by the one or more image sensors of the tablet computer and communicated over a network in real time to a remote server (not shown). In addition to the one or more images, the tablet computer communicates to the remote server AR metadata that corresponds with the physical space captured in the one or more images. Generally, the AR metadata is derived via input received via the tablet computer's motion sensing hardware and/or computer vision analysis. The AR metadata allows for the creation of a correspondence between the real-world physical space that the end-user inhabits and a virtual space (generally referred to as AR space) in in which visual content can be modeled. This combination of an image and its associated AR metadata allows the room designer, using the room design application presented on the client computing device 106 to properly position products in the image (or, images) so that the product images will appear realistic in a live AR view of a scene as rendered by an end-user's tablet computer 102.

By way of example and with reference to FIG. 1, the room designer has selected a particular coffee table from a list of recommended products. As will be described in greater detail below, the ranked list of products presented to the room designer is generally generated algorithmically taking as input a variety of input signals, including but by no means limited to the following: information about products (and their attributes) obtained from the one or more images captured by the end-user's mobile computing device; historical tracking data that is derived from the end-user's interactions with various applications and services, such as, a product search history for an online marketplace, products that have been selected and placed in an AR scene by the end-user, products that have previously been purchased or saved to a wishlist, products (and their attributes) that appear in photographs of rooms or spaces that the end-user has saved to a list of favorites or added to an "ideabook", and so forth. After selecting the coffee table, by interacting with the user interface presented via client computing device 106, the room designer has positioned the coffee table in the AR scene, and submitted the room design to the server (not shown). In this instance, the room design amounts to the visual content representing the selected product (coffee table) and the information identifying its position in AR space. From the server, this information is either pushed to the end-user's AR mobile computing device, or sent to the AR mobile computing device in response the mobile computing device polling or requesting an update. In any case, upon receiving the information, the live AR scene presented on the end-user's tablet computer 102 is rendered to include the image of the coffee table 104, even though the actual coffee table is not present in the room 100.

Figure 2:
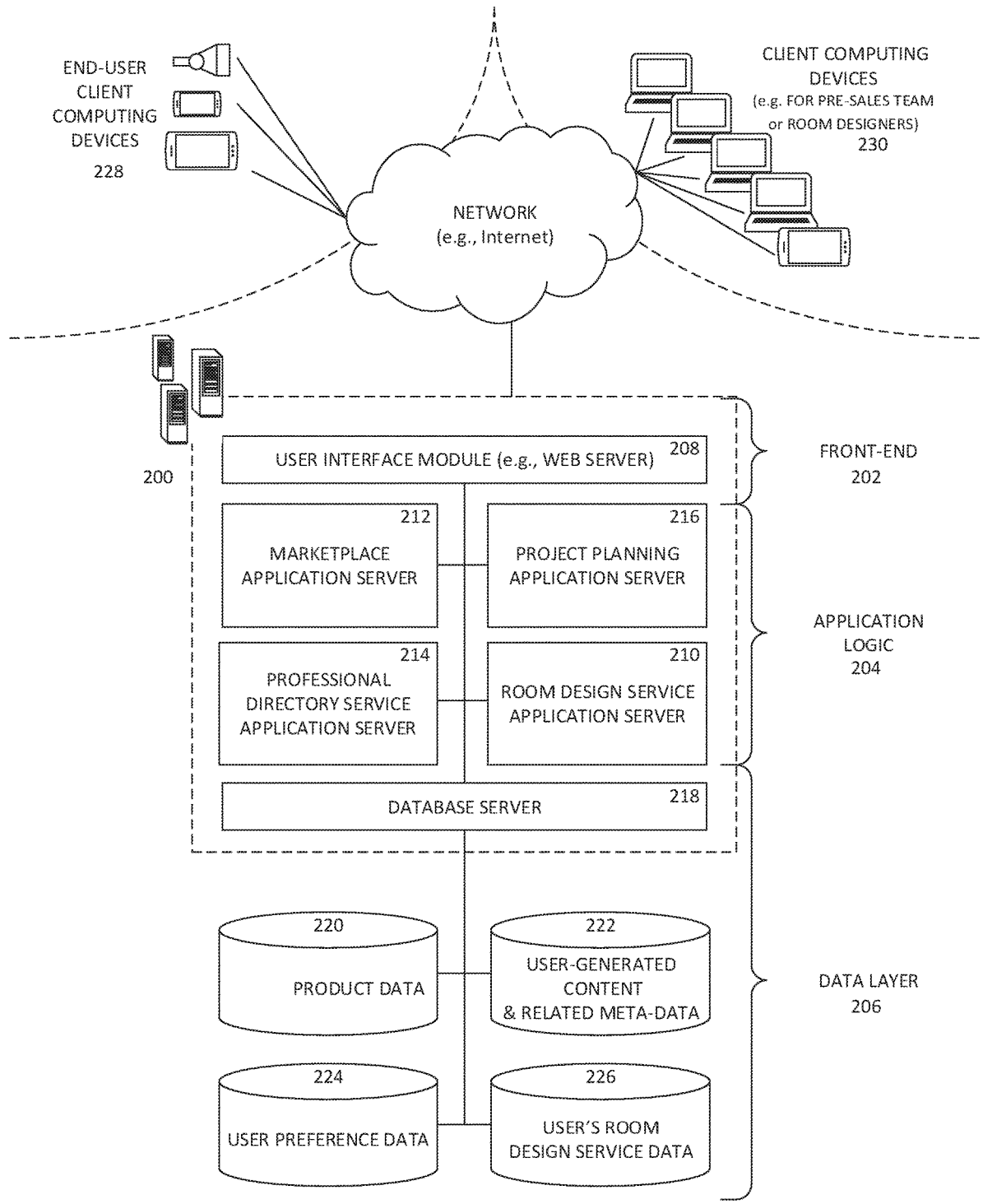
FIG. 2 is a system diagram illustrating various components of a system providing end-user applications and services, and with which a room design service application may be integrated, consistent with some embodiments of the invention.

FIG. 2 is a system diagram illustrating an overall architecture and various components of a system 200 providing end-user applications and services, and with which an AR application-based room design service may be integrated, consistent with some embodiments of the invention. The various components illustrated in FIG. 2 may be embodied in hardware, software, or a combination of hardware and software, and similarly, the various components may be part of a single server computer system, or, may be part of a distributed system of networked computers. With some embodiments of the present invention, an AR application-based room design service may be one of a variety of applications and/or services offered and accessed in connection with an online platform or portal, having a website, one or more mobile applications, and being devoted to architecture, interior design and decorating, landscape design and home improvement. The system 200 illustrated in FIG. 2 is presented as an example of the type of system via which such an online platform or portal may be implemented. As illustrated in FIG. 2, the system 200 consists of three layers, a front-end layer 202, an application logic layer 204, and a data layer 206.

The front-end layer 202 generally consists of a user interface module (e.g., a web server 208), which receives requests from various client-computing devices, and communicates appropriate responses to the requesting client devices. For example, the user interface module(s) 208 may receive requests in the form of Hypertext Transport Protocol (HTTP) requests, or other web-based, application programming interface (API) requests. In general, end-users interact with the system 200 using any one of a variety of AR-capable mobile computing devices 228, such as mobile phones, tablet computers, head-mounted displays and/or glasses with a built-in heads-up display. Similarly, with some embodiments, a team of room designers may interact with the system 200 via client computing devices 230, which may be desktop or laptop computers, or mobile tablet computers, or any similar device.

The application logic layer 204 includes various application servers, which, in conjunction with the user interface module(s) 208, generate various user interfaces with data retrieved from various services and data sources in the data layer 206. Consistent with some embodiments, each application server is a server program (e.g., software instructions) executed by a server computer, or distributed network of computers, that provide the application or business logic for the corresponding application. With some embodiments, individual application servers are used to implement the functionality associated with various applications, services and features of the various application programs provided via the portal or platform. For example, and as illustrated in FIG. 2, the application-based room design service is implemented with one application server 210, while other applications are shown to be implemented with separate application servers (e.g., the marketplace application server 212), and so on. Accordingly, a variety of other applications or services (not shown) that are made available to end-users of the online platform or portal may be embodied in their own application servers.

Generally, the data layer 206 includes one or more database servers 218 for writing data to and reading data from one or more databases (e.g., databases with reference numbers 220, 222, 224 and 226). Consistent with some embodiments, each application server will access data services of the data layer 206, as necessary, to generate the appropriate user interfaces and content for presentation to the end-users and/or room designers. Accordingly, one database 220 stores data relating to products available via the online marketplace. In addition to the conventional product attributes (e.g., price, dimensions, color, brand, inventory and product availability, shipping information, and so on), the product data may include references to user-generated content (e.g., photographs) in which each product appears. For example, the database with reference number 222 stores user-generated content and related metadata. With some embodiments, end-users, and in particular, service professionals in the home building, renovation and design services industry, can post photographs of their work product. These photographs may be algorithmically and/or manually analyzed and tagged with metadata that includes information about the photographs. Accordingly, an end-user interested in a product appearing in the marketplace may be presented with an image of the product appearing in a photograph submitted by a professional designer, thereby giving the end-user a sense of the product in a professionally designed environment.

The database with reference number 224 stores data relating to inferred and/or explicitly provided preference information of the end-user. For instance, with some embodiments, one or more applications may prompt an end-user for information about his or her preferences (e.g., architectural or design styles, favorite colors or fabrics, price points, and so forth). Additionally, with some embodiments, each interaction that an end-user has with an application or service may be monitored and tracked, such that information obtained from the interactions can be used to infer preferences of the end-user. By way of example, if an end-user performs various product searches via the marketplace, the end-user's query (e.g., search string) and the end-user's selections from the provided search results may be used to infer end-user preferences. Similarly, if the end-user interacts with (e.g., views, saves, shares, adds to a list of favorites, etc.) certain photographs, information obtained from those photographs may be used to infer end-user preferences.

The data layer 206 includes a database 226 for storing information relating to the room designs generated by room designers via the room design application service. For example, each time an end-user initiates a design consultation request, the request is processed by a room designer. The room designer may generate one or more room designs, with each room design including a selection of one or more products, and information as to where the one or more products are to appear in AR space, in accordance with the image or images and AR metadata received from the end-user's mobile computing device. This information is stored in the database with reference number 226, thereby allowing an end-user with the ability to recall various room designs that have been saved by a room designer. Recalling a saved room design will result in information being communicated from the server to the end-user's mobile computing device, where the AR-capable mobile application will process the information to render images of products superimposed over a live AR view of a room or scene, in accordance with the information received from the server.

As referenced above, in addition to the room design application service 210, the system 200 illustrated in FIG. 2 is shown to include a marketplace application server 212. Accordingly, with some embodiments of the invention, the AR application-based room design service operates in connection with an integrated online marketplace, having a variety of information about products, including but not limited to, furniture, home furnishings, landscaping and home renovation products, and related goods. Each product available via the marketplace may be associated with a wide variety of product attributes, associated with and/or describing the product. Accordingly, when searching for products, these product attributes can be used as search and filtering criteria.

With some embodiments, the system may provide one or more project planning application servers. A project planning application may include an online space for storing and accessing user-generated content (e.g., photographs). For example, a project planning application may support the creation of lists or "ideabooks" via which end-users can generate and store a personally curated collection of favorite photographs.

Finally, as shown in FIG. 2, the system includes a room design application server 210. This application server 210 facilitates the room design application used by room designers to select and position products for presentation on end-users' AR-capable mobile computing devices. The room design application is described in greater detail below, in connection with the description of FIG. 3.

Figure 3:
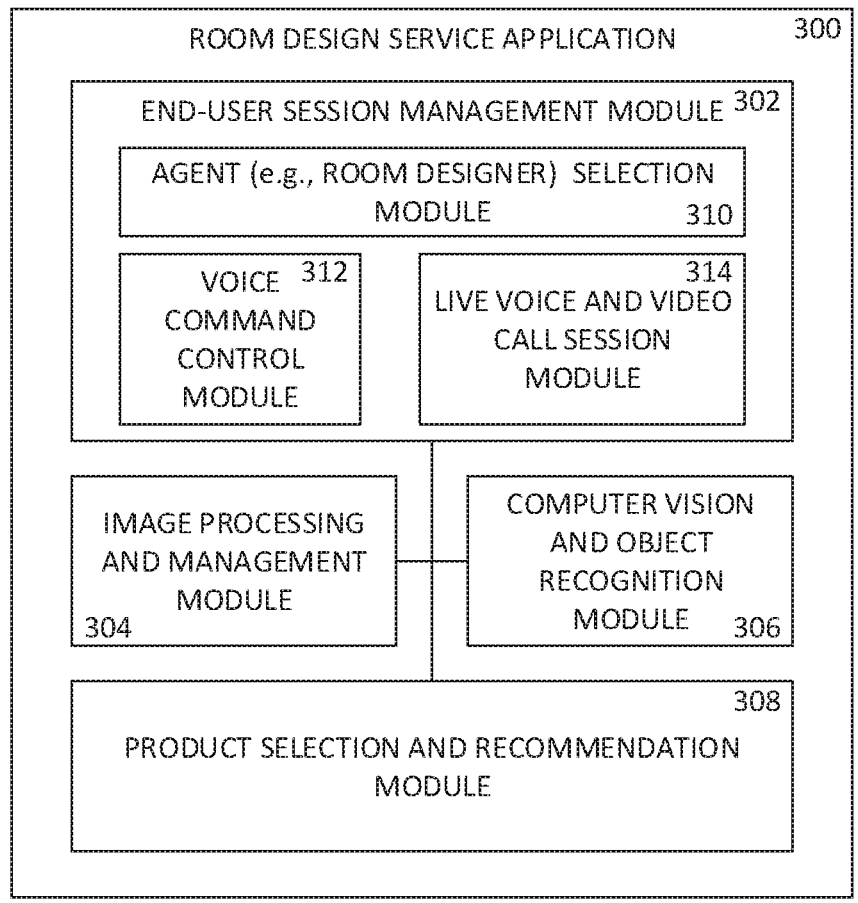
FIG. 3 is a system diagram illustrating the various functional components that comprise a room design application server that facilitates the remote selection and placement, by a room designer, of objects (e.g., visual representations of products) in an AR view of an end-user's AR-capable mobile application, consistent with some embodiments of the present invention.

FIG. 3 is a system diagram illustrating the various functional components that comprise a room design application service that facilitates the remote selection and placement, by a room designer, of visual content in an AR view of an end-user's AR-capable mobile application, consistent with some embodiments of the present invention. As illustrated in FIG. 3, the room design application service 300 includes an end-user session management module 302, an AR image processing and management module 304, a computer vision and object recognition module 306 and a product selection and recommendation module 308.

As its name suggests, the end-user session management module 302 manages end-user sessions, for example, by establishing connections between resources of the system 200 and the end-user mobile computing devices 228 and client computing devices 230 of the room designers. For example, when an end-user initiates a design consultation request, the session management module creates a record identifying the end-user from whom the request was received. Any room designs that result, from the request, are stored in association with this record, so as to identify any saved room designs associated with the end-user, and the particular request from the end-user.

Consistent with some embodiments, when an end-user initially requests help from a member of a room design team, the initial request includes information identifying the end-user. As an example, the request may occur subsequent to the end-user having authenticated him- or herself, by providing a username and password. In any case, upon receiving the request the agent selection module 310 retrieves end-user preference data for the particular end-user, and uses this end-user preference data to assign the request to an appropriate room designer, e.g., based on information associated with the expertise or preferences of each room designer. For instance, each room designer may have a profile that includes information about his or her expertise, preferred styles, and so forth. Similarly, in some instances, a design consultation request may be associated with a preferred pricing level (e.g., high, low medium, or, "$", "$$", "$$$"). Accordingly, the selection of a room designer may be made in part based on the experience level that a room designer has at the specified or preferred price level.

With some embodiments, the session management module 310 includes a live voice and video call session module 314. This module 314 processes requests for live connections between end-users and room designers, ensuring that the respective devices are connected for the purpose of having live voice or video calls. With some embodiments, the end-user's AR-capable mobile application may support voice command control. Accordingly, an end-user can speak commands, which are captured at the end-user's mobile computing device and processed by the voice command control module 312 of the room design service application 30X). By way of example, an end-user who is viewing a superimposed image of a coffee table in a live AR view may speak commands, such as, "show me the glass top table" or "show me this table in walnut." These commands are communicated from the end-user's mobile computing device to the room design application server 300, where the voice command control module 312 processes the command, and generates an appropriate response. An appropriate response is highly dependent upon the context, but generally may involve obtaining the relevant requested information, and communicating the same to the mobile computing device so that any superimposed images may be updated to reflect different images that are consistent with what has been requested by the end-user.

Consistent with some embodiments, the image processing and management module 304 receives individual images, or in some instances a series of images or video stream, from an end-user's mobile computing device, and then stores the images or video stream and/or relays the images or video stream in real time to a client computing device in operation by a room designer. In addition to handling images, the image processing and management module 304 receives and stores AR metadata associated with any received images. As such, the image processing and management module 304 receives the information necessary to construct a shared representation of an AR scene. Accordingly, when a room designer interacts with the images by positioning an image of a product, the image is "tied" to the virtual space (AR space), as represented by the AR metadata, and thus, when the corresponding object is rendered in AR space on the end-user's mobile computing device, the object will maintain its position and orientation relative to the real-world scene.

With some embodiments, the room design service application 300 includes a computer vision and object recognition module 306. This module 306 accesses images from an AR image stream and processes these images to identify objects and their attributes, as those objects appear in real-world scenes (e.g., rooms). As an example, the output of this analysis, for a given image or set of images, may be used to identify the type of furniture in a room (e.g., a sofa, chair, rug, wall art, and so forth), the size, color and materials (e.g., wood, metal, glass, fabric) of the furniture, and many other relevant attributes. These attributes can then be used by the product selection and recommendation module 308 to generate a list of top recommended products to a room designer, where such products (e.g., images or 3D renderings) can be placed in AR space for rendering in two dimensions in a live AR view on an end-user's AR-capable mobile computing device. As an example, the product selection and recommendation module 308 may use the attributes identified by the object recognition module 306, along with other information, such as end-user preference data, to generate queries which are executed against a database of products.

As an example, with some embodiments, the object recognition module may output a count of the type of each object identified in a room—e.g., one sofa, one side table, three lamps, two vases, two rugs, a television stand, and so forth. This information may be used to identify one or more types of objects (e.g., additional furniture items or home furnishings) that normally appear together, as evidenced by analyzing photographs submitted by professionals. Accordingly, if a particular type of object tends to appear together with another type of object or sets of objects, but the object recognition module 308 does not identify that type of object in a given room, that particular type of object may be one that is recommended to the room designer for placement in an end-user's real-world space. Accordingly, a query will automatically be built to query a database of products and thereby populate a list of recommended products that is presented to the room designer, where the list includes items from that type.

In another example, the attributes of the objects identified by the object recognition module 306 may be used to identify products having similar attributes. For example, if the object recognition analysis indicates that an end-user has a furniture item that is from a particular designer or brand, this information may be useful for querying the product database to find other products that will complement those identified in the end-user's room, via the image analysis.

Figure 4:
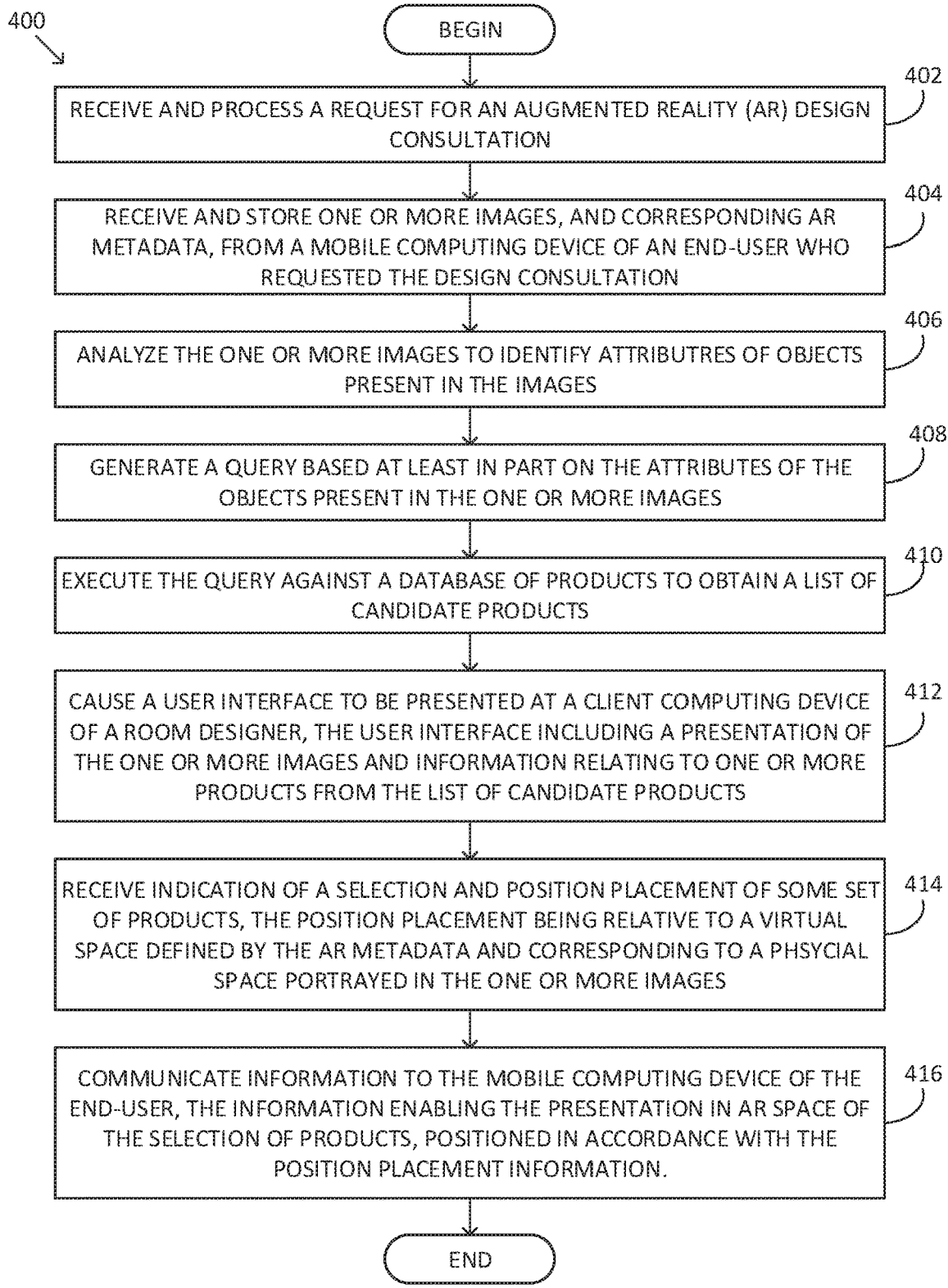
FIG. 4 is a flow diagram illustrating the various method operations that occur when generating various user interfaces to present objects (e.g., home furnishings and related products) to a room designer, for selection and placement in an AR view of an end-user's AR-capable mobile application, according to some embodiments of the present invention.

FIG. 4 is a flow diagram illustrating the various method operations that occur when generating various user interfaces to present items (e.g., home furnishings and related products) to a room designer, for selection and placement in an AR view of an end-user's AR-capable mobile application, according to some embodiments of the present invention. Consistent with some embodiments, at method operation 402, an end-user initiates an AR application-based design consultation with a remote room designer by interacting with an AR application on his or her mobile computing device, and selecting a user interface object via a touch screen display of the device. By way of example and with reference to FIG. 5, the mobile application may present a variety of buttons (such as button 506 in FIG. 5, with label "Request AR Design.") Selection of this button 506 causes the end-user's mobile computing device to generate a design consultation request that is communicated to a server.

Next, after processing the design consultation request and allocating the request to an appropriate designer, a method operation 404, the server receives and stores an image (or, images), and corresponding AR metadata, as captured or derived with a camera and other sensors on the end-user's mobile computing device. The AR metadata generally consists of a data representation of a virtual space that corresponds with a real-world physical space presented in the one or more images.

Next, at method operation 406, the images received at the server may optionally be analyzed by a computer vision and object recognition module (e.g., such as that shown in FIG. 3 with reference number 306). The object recognition analysis will yield output in the form of attributes of objects identified in the images.

At method operation 408, a query is generated using, in part, attributes of the objects present in the images received at the server, from the end-user's mobile computing device. At method operation 410, the query is executed against a database of products to identify a set of candidate products.

With some embodiments, the candidate products may be further ranked and/or filtered, to generate a ranked list of candidate products.

At method operation 412, the server causes a user interface to be presented at a client computing device of a room designer. The user interface includes a presentation of the one or more images as well as information concerning the virtual space that corresponds with the real-world space presented in the images. The user interface additionally includes a list of top recommended products that the room designer might consider for selection and placement in the virtual space (AR space) that corresponds with the real-world space.

Using the design application, the room designer will manipulate the images of the recommended products by positioning the images of the products, overlaid on one or more of the images of the physical space. By positioning the images in this manner, the room designer is identifying the position of the products in virtual space, and thus effecting how—specifically, where—the images of the product will appear when rendered on the end-user's AR-capable mobile computing device. Accordingly, at method operation 414, the server receives an indication of a selection and position placement of some set of products, of which, some may be from the set of candidate products. The position information derived from the placement of the images via the user interface presented to the room designer is stored in association with images of the products, at the server.

Finally, at method operation 416, the information about the products and their position in virtual space (AR space) are communicated to the AR application executing on the end-user's mobile computing device, where, when the end-user views the space using the AR application, the live AR view of the space will include the presentation of the products, as selected and positioned, by the room designer using the room design application.

Figure 5:
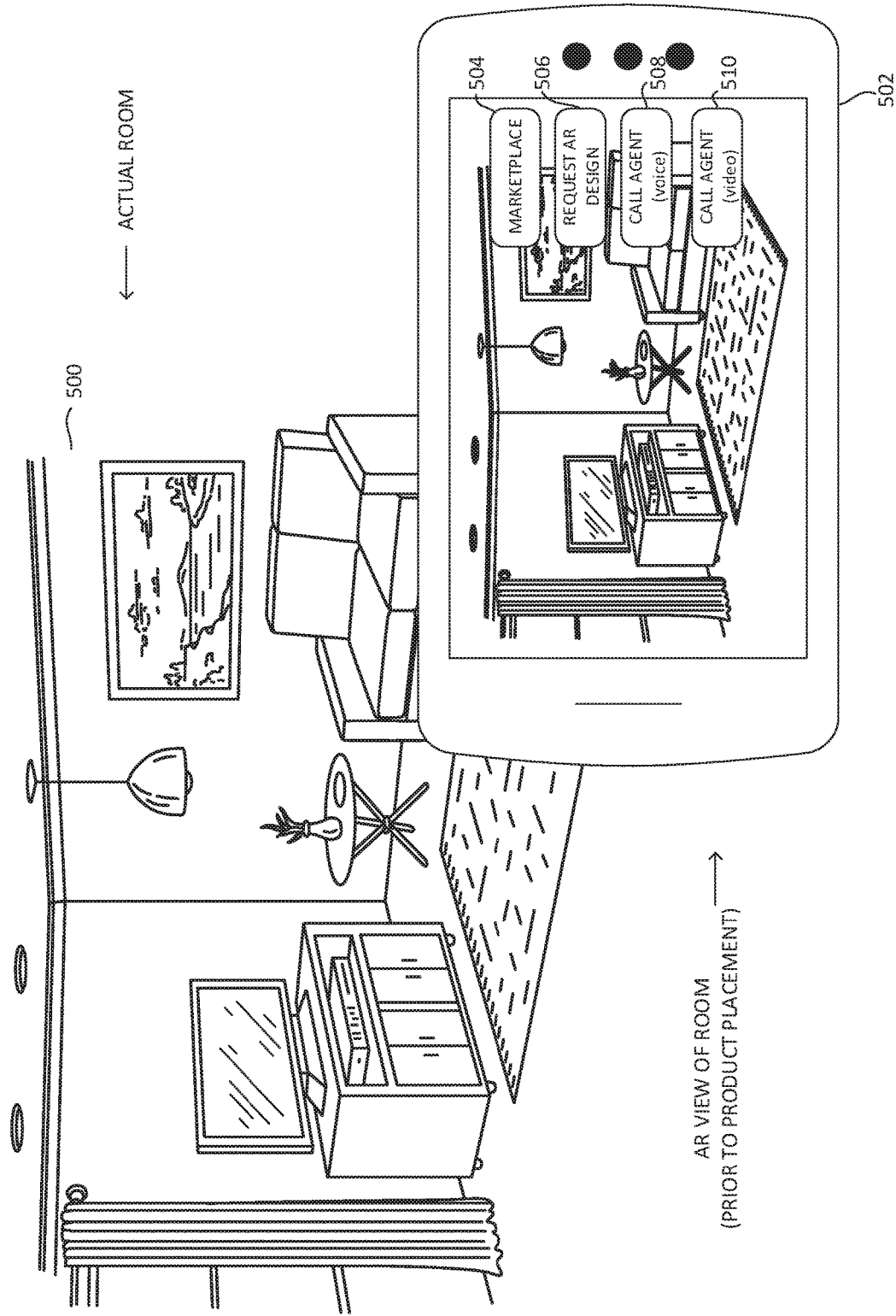
FIG. 5 is a user interface diagram illustrating an example of a user interface for an AR-capable mobile application that provides one or more user interface control elements (e.g., buttons) to initiate a room design consultation, consistent with embodiments of the present invention.

FIG. 5 is a user interface diagram illustrating an example of a user interface for an AR-capable mobile application that provides one or more user interface control elements (e.g., buttons) to initiate a room design consultation, consistent with embodiments of the present invention. In this example, the end-user's mobile computing device 502 is executing an AR-capable application. The AR-capable application is rendering a live view of the end-user's room. As illustrated in FIG. 5, the mobile computing device 502 is presenting a user interface that includes several user interface control elements (e.g., buttons). A first button, labeled, "Marketplace", provides the end-user with access to an online marketplace of products. Although not shown here, consistent with some embodiments of the invention, products accessed via the online marketplace can be placed, by the end-user, in a live AR view of a real-world scene. Accordingly, the end-user can select and position products on his or her own, if desired. However, in the case that the end-user would like the help of a professional room designer, the mobile application includes several options for requesting such help. For example, as illustrated in FIG. 5, the button 506 with the label, "Request AR Design" provides the end-user with a means to initiate a design consultation request. By selecting this button 506, a request will be communicated from the end-user's mobile computing device 502 to a server, where the request will be processed, and assigned to an appropriate room designer. With some embodiments, upon selecting the button 506, the end-user may be prompted to hold his or her mobile computing device in a manner that will capture, with the camera of the device, the room or scene for which the end-user would like assistance in designing.

With some embodiments, design consultation requests are processed in real time, such that the request will be relayed to an appropriate room designer, and the room designer will immediately begin the process of selecting and positioning products for the end-user. However, with some embodiments, the request may be processed asynchronously. Accordingly, the end-user may be prompted to capture the scene with the camera of his or her mobile computing device 502, and then specify any design parameters (e.g., price point, style, etc.) The end-user may then be notified of a subsequent time at which the room design will be completed and made available for viewing in AR via the mobile computing device.

As illustrated in FIG. 5, two additional buttons (e.g., buttons 508 and button 510) provide the end-user with the option for collaborating with a room designer in real time, for example, via a voice call or a video call. For instance, by selecting the button 508, with the label, "Call Agent (Voice)", the end-user can initiate a voice call to speak with a room designer, while the room designer is receiving and viewing one or more images (or, a video stream) of the end-user's room, as captured and transmitted by the end-user's mobile computing device 502. Accordingly, this allows the end-user to discuss with the room designer his or her preferences. The room designer can then select and position products in an iterative manner, requesting the end-user's feedback in real time. Similarly, the button 510 with the label, "Call Agent (video)" provides the end-user with the option of initiating a video call with the room designer assigned to process his or her design consultation request. As such, a front-facing camera—that is, a camera that is on the same side of the mobile computing device 502 as the touch-enabled display—will capture images of the end-user, which are communicated to the client computing device of the room designer for presentation to the room designer. Similarly, the client computing device of the room designer will transmit video/audio to the end-user's mobile computing device 502.

Figure 6:
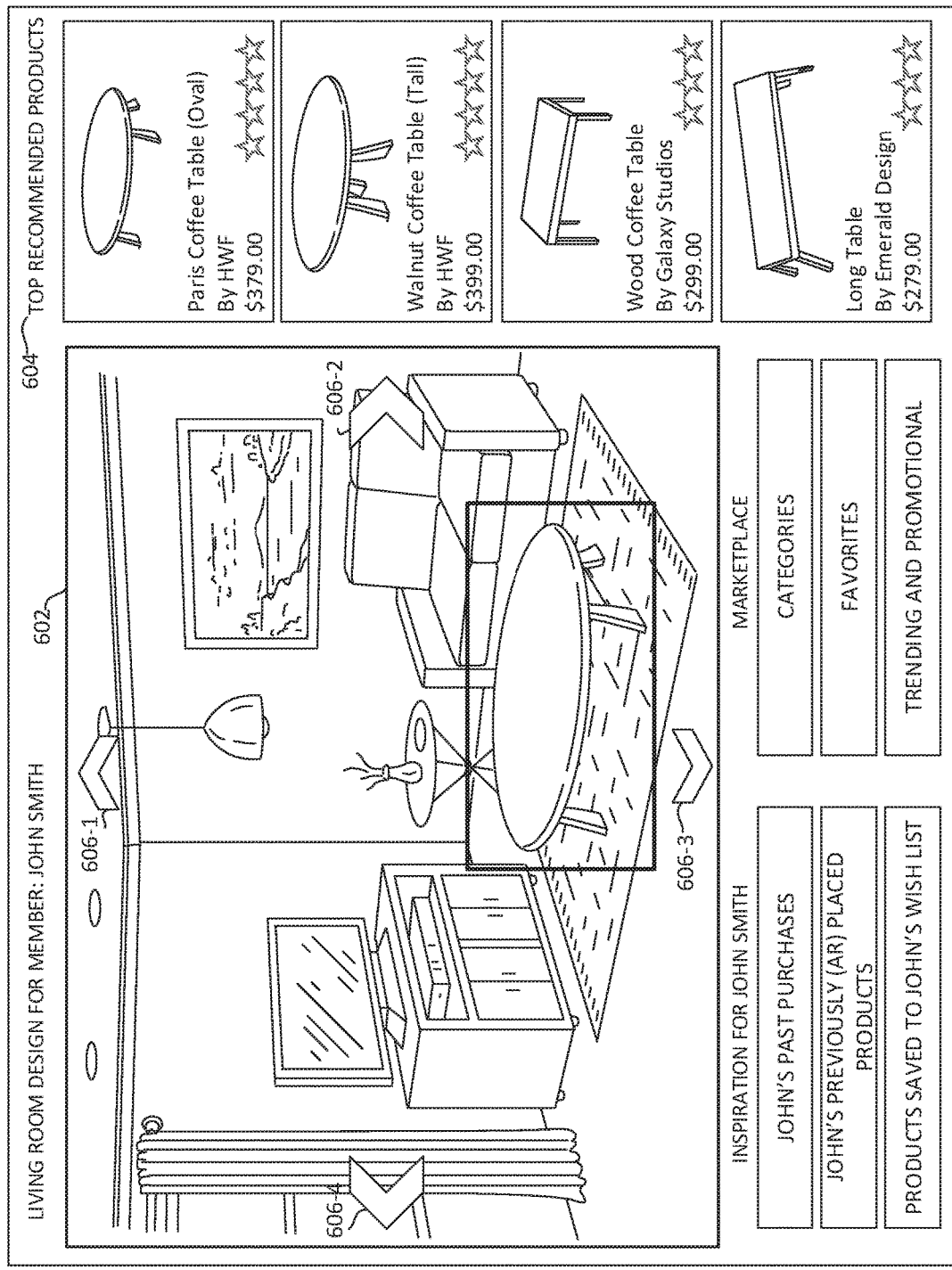
FIG. 6 is a user interface diagram illustrating an example of a user interface for a design application, via which a room designer selects and positions objects, such that a visual representation of those objects will appear in a live AR view at an end-user's AR-capable mobile computing device, consistent with some embodiments of the present invention.

FIG. 6 is a user interface diagram illustrating an example of a user interface for a design application, via which a room designer selects and positions items, such that those items will appear in an AR view at an end-user's AR-capable mobile computing device, consistent with some embodiments of the present invention. As illustrated in FIG. 6, the user interface 600 includes a first module or panel 602 for presenting images of a room or scene, as captured by a remote camera of an end-user's mobile computing device. With some embodiments, a single still image (e.g., photograph) may be presented in the panel 602. In other embodiments, the presentation of the real-world scene may be a series of images (e.g., a video), which may have been previously captured and recorded, or may in some instances be a live image stream relayed in real time from the end-user's mobile computing device. The images that are presented in the panel 602 are associated with AR metadata, allowing the room designer to position products in a shared AR space. With some embodiments, an image may be a wide-angle image, panorama image, or even an image captured in three-hundred sixty degrees. As shown in FIG. 6, with some embodiments, the room designer may be able to navigate the image or images using navigation controls, such as those shown with reference numbers 606-1, 606-2, 606-3 and 606-4 in FIG. 6. Although not shown in FIG. 6, with some embodiments, the navigation controls may also include those for playing, pausing, rewinding, etc., a sequence of images or a video stream, and selecting one or more particular images from the sequence or video stream.

In addition to the first panel 602, the user interface of the design application includes a list of top recommended products 604. Consistent with some embodiments, this list of recommended products is algorithmically derived using a variety of information obtained from the image or images received from the mobile computing device of the end-user, as well as end-user preference information—both inferred, and as explicitly stated by an end-user. As shown in this example, the list of recommended products includes a variety of coffee tables. The room designer has positioned the top recommended coffee table in the image shown in panel 602. Consistent with some embodiments, once a product has been positioned in an image, the information about the product and its positioning in AR space associated with the real-world physical space, is communicated to the end-user's mobile computing device, thereby enabling the AR application on the end-user's mobile computing device to render the real-world scene including the superimposed image of the coffee table, positioned properly in AR space. While this example shows the positioning of a single product, it will be readily appreciated that an entire room, with any of a wide variety of products, could be designed and presented in AR space in this manner.

As illustrated in the example user interface of FIG. 6, the room designer is presented with some additional menu options. For instance, with some embodiments, the room designer may be presented with information that will help the room designer select products that are most likely to be of interest to the end-user, based on the end-user's tastes and preferences. As shown in FIG. 6, one menu option or button is labeled, "John's Past Purchases". By selecting this option, the room designer will be presented with information about the end-user's previously purchased products. As such, by viewing the end-user's past purchases, the room designer may get a sense of the end-user's overall style preferences, and/or be able to select products that complement specific past purchases.

In addition to past purchases, one option provides the room designer with the ability to view products that the end-user (John, in this example) has positioned in AR space, either in the same room as that being presented in panel 602, or another room or space. For example, by selecting the button with the label, "John's Previously (AR) Placed Products", the room designer will be presented with a list of products that the end-user (John) has previously viewed in AR space. For instance, if John has viewed and placed one or more coffee tables in a room, using the AR application to view the room with the selected tables, the room designer may get a sense of what coffee table the end-user likes, or perhaps does not like.

Finally, a third menu option—the button with label, "Products Saved to John's Wishlist"—provides the room designer with the ability to view products that the end-user has saved to a wishlist or list of favorites, or, in some instances, added to a project plan or "ideabook".

In the example of FIG. 6, all of the recommended products are coffee tables. This may be the case, as a result of the end-user explicitly indicating that he is looking only for a coffee table. Alternatively, the computer vision and object recognition analysis that is performed on the various images received from the end-user's mobile computing device may have determined that the room contained objects of a type (e.g., sofa, rug, hanging lamp, wall art, television stand, etc.) that typically are presented with a coffee table, when no object was recognized as a coffee table. In any case, the room design application provides further menu options providing the room designer with selecting additional and different products from the online marketplace, for positioning in AR space, for viewing by the end-user. As shown in FIG. 6, the button with label, "Categories", provides the room designer with the ability to select a category of products from the online marketplace. Accordingly, if the room designer prefers a different category of product, the room designer can select a different category and be presented with other products for positioning in AR space. Similarly, if the room designer has a list of favorite products, that list is accessible via the button with the label, "Favorites". Finally, if certain products are trending in the marketplace—that is, if a particular product is being purchased at a high frequency rate—or, if certain products are subject to promotion for one reason or another, a list of such products can be obtained by the room designer by selecting the button with the label, "Trending and Promotional".

Figure 7:
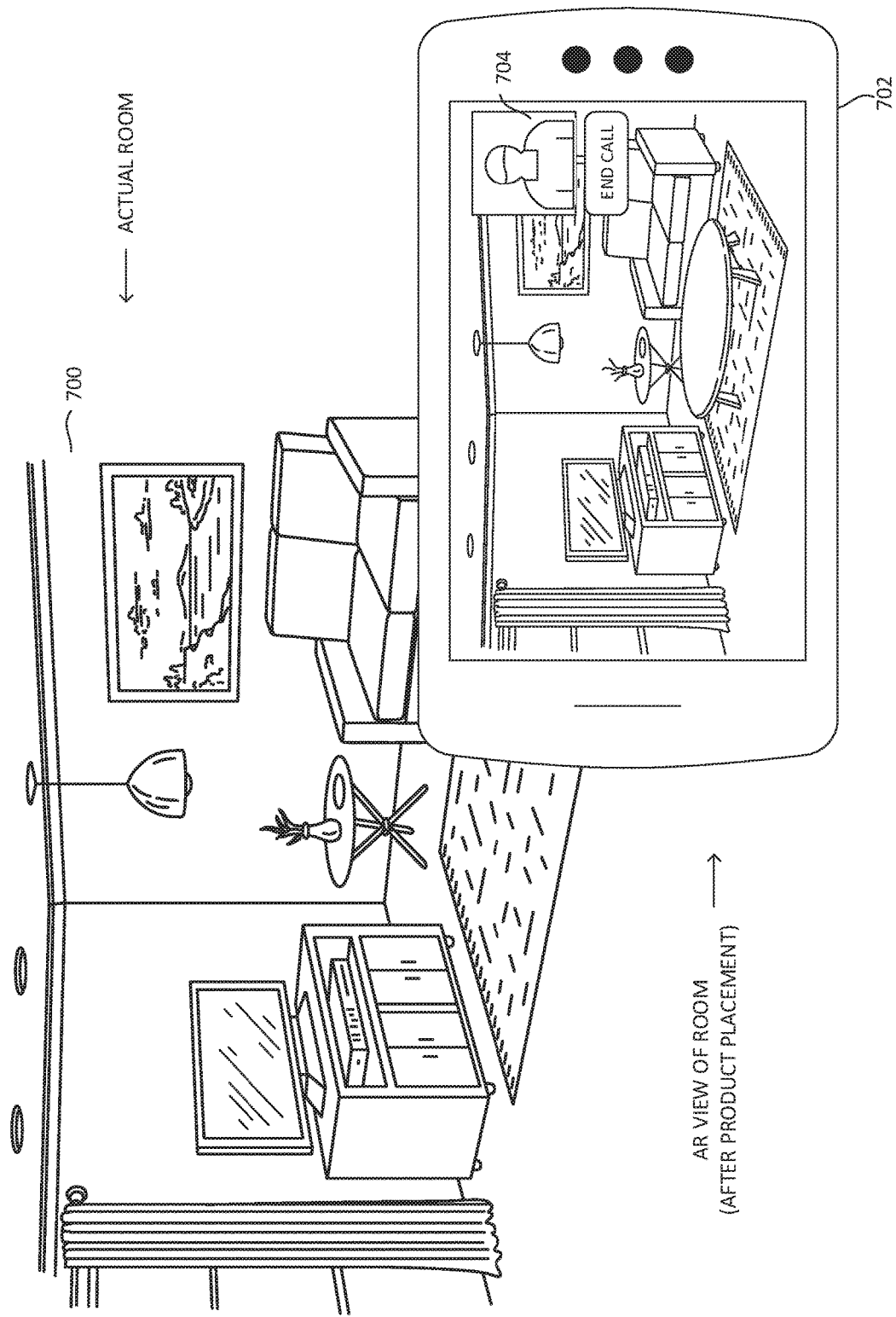
FIG. 7 is a user interface diagram illustrating an example of a user interface for an AR-capable mobile application that provides for a live AR view of a scene, for which visual content, representing one or more objects, has been selected and positioned by one or more remote room designers consistent with embodiments of the present invention.

FIG. 7 is a user interface diagram illustrating an example of a user interface for an AR-capable mobile application that provides for viewing AR scenes, for which a coffee table has been selected and positioned by one or more remote room designers, consistent with embodiments of the present invention. In the example of FIG. 7, the room designer has selected a coffee table, which is appearing in the live AR scene being rendered by the end-user's mobile computing device. In this example, the end-user is collaborating live with the room designer, via a video call. Accordingly, as shown in FIG. 7, a video call panel 704 appears in the upper right corner of the user interface. As such, the end-user can discuss, in real time, his or her preferences with the room designer. If, for example, the room designer positions a coffee table in AR space, and the end-user does not like it, the end-user can simply indicate this preference to the room designer (e.g., via the live video call session) who can immediately replace the AR object with another. In this manner, the end-user and room designer can quickly and efficiently collaborate to identify one or more products of interest to the end-user.

With some embodiments, the room designer can save different room designs, with different selections of products and/or different placements of those products in AR space, for a given end-user's design consultation request. Accordingly, the end-user can simply select from a list of previously saved room designs to recall any one of the previously saved room designs and thereby obtain a real-world AR view of the room design, with the selected products and specific product placements. This feature depends upon the AR mobile application being able to realign a scene from one AR session to another. With some embodiments, each product that is placed in AR space by a room designer, is saved and accessible to the end-user in a list. At any time, the end-user can simply recall this list to view information about the product and/or conclude a purchase transaction to purchase the product. With some embodiments, an end-user can select to purchase all the products that are presented in a particular room design. This will quickly facilitate the online checkout process, by generating a purchase list of the selected products for concluding the purchase transaction.

Figure 8:
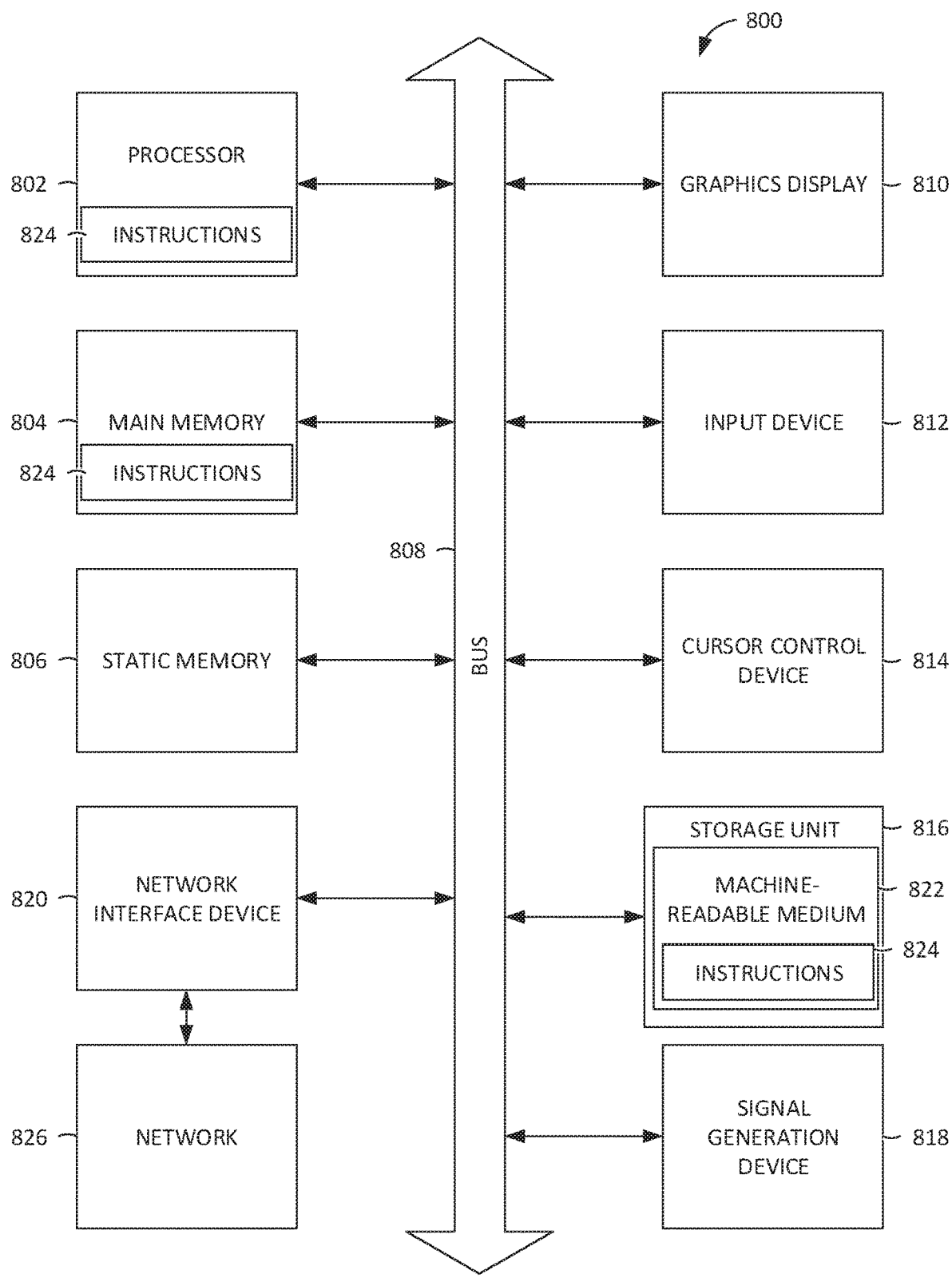
FIG. 8 is a system diagram illustrating an example of a computing device with which, embodiments of the present invention might be implemented.

FIG. 8 is a block diagram illustrating an example of a machine upon which one or more example embodiments may be implemented. In alternative embodiments, the machine (800) may operate as a standalone device or may be connected (e.g., networked) to other machines. In a networked deployment, the machine (800) may operate in the capacity of a server machine, a client machine, or both in server-client network environments. In an example, the machine (800) may act as a peer machine in peer-to-peer (P2P) (or other distributed) network environment. The machine (800) may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine (800) is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating in an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) (800) may include a hardware processor (802) (e.g., a central processing unit (CPU), a graphics processing unit (GPU), a hardware processor core, or any combination thereof), a main memory (804) and a static memory (806), some or all of which may communicate with each other via an interlink (e.g., bus) (808). The machine (800) may further include a display device (810), an alphanumeric input device (812) (e.g., a keyboard), and a user interface (UI) navigation device (814) (e.g., a mouse). In an example, the display device (810), input device (812) and UI navigation device (814) may be a touch screen display. The machine (800) may additionally include a mass storage device (e.g., drive unit) (816), a signal generation device (818) (e.g., a speaker), a network interface device (820), and one or more sensors (821), such as a global positioning system (GPS) sensor, compass, accelerometer, or another sensor. The machine (800) may include an output controller (828), such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device (816) may include a machine-readable medium (822) on which is stored one or more sets of data structures or instructions (824) (e.g., software) embodying or utilized by any one or more of the techniques or functions described herein. The instructions (824) may also reside, completely or at least partially, within the main memory (804), within static memory (806), or within the hardware processor (802) during execution thereof by the machine (800). In an example, one or any combination of the hardware processor (802), the main memory (804), the static memory (806), or the storage device (816) may constitute machine-readable media.

While the machine-readable medium (822) is illustrated as a single medium, the term "machine-readable medium" may include a single medium or multiple media (e.g., a centralized or distributed database, and/or associated caches and servers) configured to store the one or more instructions (824).

The term "machine-readable medium" may include any medium that is capable of storing, encoding, or carrying instructions (824) for execution by the machine (800) and that cause the machine (800) to perform any one or more of the techniques of the present disclosure, or that is capable of storing, encoding or carrying data structures used by or associated with such instructions (824). Non-limiting machine-readable medium examples may include solid-state memories, and optical and magnetic media Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions (824) may further be transmitted or received over a communications network (826) using a transmission medium via the network interface device (820) utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMAX®), IEEE 802.15.4 family of standards, peer-to-peer (P2P) networks, among others. In an example, the network interface device (820) may include one or more physical jacks (e.g., Ethernet, coaxial, or phone jacks) or one or more antennas to connect to the communications network (826). In an example, the network interface device (820) may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions (824) for execution by the machine (800), and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and unless otherwise stated, nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computer-implemented method performed by one or more server computers, the method comprising:
   receiving and storing information from a mobile computing device executing an augmented reality application, the information including an image of a real-world physical space captured by an image sensor of the mobile computing device, and a data representation of a virtual space corresponding to the real-world physical space, wherein the data representation of the virtual space includes information indicating a position of a virtual camera, within the virtual space, as determined by the mobile computing device using as input obtained from sensors of the mobile computing device, RGB images, depth images, IMU (inertial measurement unit) sampling data, and inferred scene geometry data;
   causing the image of the real-world space to be presented in a user interface at a client computing device, the user interface having controls to facilitate overlaying a rendered 3D model of a product on top of the image of the real-world physical space, wherein positioning and orientation of the rendered 3D model of the product overlaid on the image of the real-world physical space generates information indicating the position and orientation of the product relative within the virtual space, and the data representation of the virtual space including information indicating the position of the virtual camera is used to render the 3D model of the product in the user interface at the client computing device;
   storing the information for rendering images of the product along with the information indicating the position and orientation of the product relative to the model of virtual space, thereby enabling the stored information to be communicated to the mobile computing device later in time; and
   communicating to the mobile computing device executing the augmented reality application information for rendering images of the product along with the information indicating the position of the product relative to the model of virtual space, thereby enabling a 3D representation of the product to be rendered as part of a live augmented reality view of the real-world physical space.

2. The computer-implemented method of claim 1, wherein causing the image of the real-world physical space to be presented in a user interface at a client computing device includes relaying the image of the real-world physical space received from the mobile computing device to the client computing device in real time along with the data representation of the virtual space corresponding to the real-world physical space, for presentation via the user interface at the client computing device.

3. The computer-implemented method of claim 1, further comprising:
   establishing a voice or video call session between the mobile computing device and the client computing device, thereby enabling end-users of the respective devices to collaborate via the voice or video call session.

4. The computer-implemented method of claim 1, further comprising:
   subsequent to said step of communicating information for rendering images of the product along with the information indicating the position of the product relative to the model of virtual space, i) receiving a voice command from the mobile computing device, the voice command including a request for an alternative product, and ii) processing the voice command by communicating to the mobile computing device executing the augmented reality application information for rendering images of the alternative product.

5. The computer-implemented method of claim 1, wherein the mobile computing device executing the augmented reality application from which the information is received is a mobile phone having a touch screen display and one or more accelerometers.

* * * * *